United States Patent
Ichimura et al.

(10) Patent No.: US 9,365,397 B2
(45) Date of Patent: Jun. 14, 2016

(54) QUAY CRANE

(75) Inventors: Kinya Ichimura, Tokyo (JP); Satoru Ogawa, Oita (JP); Soshi Sato, Oita (JP); Nobuya Kayasuga, Oita (JP); Hiroshi Kubo, Oita (JP); Hiroshi Kasai, Oita (JP); Sho Meno, Oita (JP)

(73) Assignee: MITSUI ENGINEERING & SHIPBUILDING CO., LTD., Tokyo (JP)

( * ) Notice: Subject to any disclaimer, the term of this patent is extended or adjusted under 35 U.S.C. 154(b) by 0 days.

(21) Appl. No.: 14/384,585

(22) PCT Filed: Mar. 23, 2012

(86) PCT No.: PCT/JP2012/057550
§ 371 (c)(1),
(2), (4) Date: Oct. 16, 2014

(87) PCT Pub. No.: WO2013/140610
PCT Pub. Date: Sep. 26, 2013

(65) Prior Publication Data
US 2015/0041618 A1    Feb. 12, 2015

(51) Int. Cl.
*B66C 5/00* (2006.01)
*B66C 15/00* (2006.01)
(Continued)

(52) U.S. Cl.
CPC .................. *B66C 15/00* (2013.01); *B66C 19/00* (2013.01); *F16F 15/08* (2013.01)

(58) Field of Classification Search
CPC .......... B66C 15/00; B66C 19/00; F16F 15/08
USPC ................................... 52/167.1, 167.7–167.9
See application file for complete search history.

(56) References Cited

U.S. PATENT DOCUMENTS

| 4,527,365 A | * | 7/1985 | Yoshizawa | F16F 7/08 267/154 |
| 4,910,930 A | * | 3/1990 | Way | E04H 9/022 52/167.1 |

(Continued)

FOREIGN PATENT DOCUMENTS

| JP | 09-184541 A | 7/1997 |
| JP | 2001-335282 A | 12/2001 |

(Continued)

OTHER PUBLICATIONS

International Search Report dated Jun. 19, 2012, issued in corresponding application No. PCT/JP2012/057550.

*Primary Examiner* — Patrick Maestri
(74) *Attorney, Agent, or Firm* — Westerman, Hattori, Daniels & Adrian, LLP

(57) ABSTRACT

Provided is a quay crane which includes a seismic isolation device formed from laminated rubber, and which is capable of withstanding a large-scale earthquake. Particularly, provided is a quay crane including a seismic isolation device with a slide length of 1000 mm or over. In a quay crane including a seismic isolation device, the seismic isolation device includes: laminated rubber formed by laminating a steel plate and a rubber material; and an auxiliary support mechanism. The auxiliary support mechanism includes: a supporting body fixed to one of a top plate side and a bottom plate side of the seismic isolation device; and a contacting plate fixed to the other thereof. The supporting body and the contacting plate constituting the auxiliary support mechanism come into contact with each other at least in the event of an earthquake, and the auxiliary support mechanism supports a weight of the quay crane.

6 Claims, 5 Drawing Sheets

(51) Int. Cl.
    *B66C 19/00*         (2006.01)
    *F16F 15/08*         (2006.01)

(56) References Cited

U.S. PATENT DOCUMENTS

| | | | |
|---|---|---|---|
| 6,688,051 B2 * | 2/2004 | Tsai | 52/167.4 |
| 2004/0041071 A1 * | 3/2004 | Whitley | G21F 5/08 |
| | | | 248/562 |
| 2007/0157532 A1 * | 7/2007 | Tsai | E04H 9/023 |
| | | | 52/167.1 |
| 2008/0222975 A1 * | 9/2008 | Nakata et al. | 52/167.9 |

FOREIGN PATENT DOCUMENTS

| | | |
|---|---|---|
| JP | 2002-348089 A | 12/2002 |
| JP | 2011/144044 A | 7/2011 |
| JP | 2011-152998 A | 8/2011 |

* cited by examiner

QUAY CRANE

TECHNICAL FIELD

The present invention relates to a quay crane used for loading and unloading containers at a port container terminal, an inland container terminal, and the like.

BACKGROUND ART

In a port container terminal, an inland container terminal, and the like, containers are loaded and unloaded on and off ships, rail cars, and trailers by quay cranes and gantry cranes. There is a seismic isolated crane in which as a seismic countermeasure for such a quay crane, a seismic isolation device is disposed between a leg structure and a travel device of the crane (see Patent Document 1, for example).

FIG. 6 shows a crane provided with seismic isolation devices. This crane 1X includes: leg structures 20 each formed from a sea-side leg 21 and a land-side leg 22; and a boom 24 and a girder 25 to be supported by the leg structures 20. Moreover, a seismic isolation device 2X is provided between each leg structure 20 and each travel device 23. Here, reference numeral 26 denotes a loading-unloading device (a trolley), reference numeral 27 denotes a container cargo ship, and reference numeral 28 denotes a container. Meanwhile, an x-axis direction indicates a lateral movement direction (a sea-land direction) of the crane while z indicates a vertical direction thereof.

Next, loading and unloading actions of the crane 1X will be described. The crane 1X performs loading and unloading actions to hoist a container 28 loaded on the container cargo ship 27 with the trolley 26, and to load the container 28 onto a trailer (not shown) standing by at a quay. In the meantime, the crane 1X performs loading and unloading actions to load the container 28 from the trailer into the container cargo ship 27. Meanwhile, in the course of the loading and unloading actions, the crane 1X performs the loading and unloading actions while moving along the quay (in a direction towards the back side of the sheet of FIG. 6 or in a direction towards the front side of the sheet FIG. 6) by using the travel devices 23, and thus changing unloading and/or loading locations.

Next, actions of the crane 1X in the event of an earthquake will be described. In the event of an earthquake, a shear pin or the like that fixes each seismic isolation device 2X breaks, thereby activating the seismic isolation device 2X. The seismic isolation device 2X has an effect of isolating the crane 1X from jolts on the ground surface. The seismic isolation devices 2X are required to be able to support the weight of the crane and to be deformable in a horizontal direction (such as the lateral movement direction x).

The seismic isolation device 2X will be described with reference to FIG. 7 to FIG. 9. FIG. 7A illustrates a side view of the seismic isolation device 2X at ordinary times. The seismic isolation device 2X includes: rubber bearing (laminated rubber) 3 formed by alternately laminating rubber materials and steel plates; a top plate 5; and a bottom plate 6. FIG. 7B illustrates a state where a top plate-side projection and a bottom plate-side projection completely overlap each other in a plan view of the laminated rubber 3. In other words, the laminated rubber 3 supports the weight of the crane with a support region S illustrated as a shaded portion. Here, C denotes a center line of the seismic isolation device 2X. In the meantime, the planar diameter of the laminated rubber 3 is in a range from about 400 to 700 mm.

FIG. 8A illustrates a side view of the seismic isolation device 2X in the event of an earthquake. The laminated rubber 3 is deformed by an external force F1 (a seismic force). FIG. 8B illustrates a state where a top plate-side projection $S_T$ partially overlaps a bottom plate-side projection $S_B$. This laminated rubber 3 supports the weight of the crane virtually with a shaded support region S. In other words, it is necessary to secure at least a predetermined area for the support region S in order to support the weight of the crane with the seismic isolation device 2X. Here, L1 denotes a slide length of the seismic isolation device 2X. The slide length L1 is about 300 mm at the maximum. The conventional quay crane 1X acquires the seismic isolation effect by using the above-described seismic isolation devices 2X. Here, $C_T$ denotes a top plate-side center line and $C_B$ denotes a bottom plate-side center line.

The revision of Port and Harbor Act of Japan in May, 2006 has changed seismic assessment standards for quays and cranes. As a consequence, in some locations, there is a case where a crane is required to absorb a horizontal deformation in the sea-land direction in an amount of about ±1000 mm. The crane 1X equipped with the above-described seismic isolation devices 2X has several problems in dealing with these standards.

First, when rubber materials with a small spring constant, i.e., soft rubber materials are used for increasing a horizontal displacement, the laminated rubber 3 has a problem that, even in the state where the top plate-side projection $S_T$ and the bottom plate-side projection $S_B$ completely overlap each other at ordinary times as shown in FIG. 7B, the laminated rubber has a low vertical load bearing capacity and cannot continue to fully support the weight of the crane.

Second, when a height of the laminated rubber is increased to deal with large horizontal displacement, the laminated rubber 3 has a problem that the top plate-side projection $S_T$ and the bottom plate-side projection $S_B$ are completely misaligned, and the laminated rubber 3 cannot support a vertical load attributed to the weight of the crane. This state will be described with reference to FIG. 9. FIG. 9A illustrates a side view of the seismic isolation device 2X in the event of a large-scale earthquake. FIG. 9B illustrates a state where the top plate-side projection $S_T$ and the bottom plate-side projection $S_B$ do not overlap at all. In the event of the large-scale earthquake, an external force F2 becomes large and a slide length L2 becomes large accordingly (300 mm or more, for example). As a consequence, no support region S is formed. For this reason, the seismic isolation device 2X cannot support the weight of the crane, and overturning moment M occurs in the seismic isolation device 2X. In other words, this seismic isolation device 2X cannot withstand the large-scale earthquake.

Third, when the diameter of the laminated rubber 3 is increased, the laminated rubber 3 has a problem of involving a wasteful design with a large vertical load bearing capacity that is more than necessary at ordinary times because the laminated rubber 3 is to be designed on the basis of a vertical load bearing capacity restriction in the event of an earthquake. FIG. 10 illustrates a seismic isolation device 2Y including laminated rubber 3Y with an increased diameter. This seismic isolation device 2Y can obtain a portion (the support region S) where the top plate-side projection $S_T$ and the bottom plate-side projection $S_B$ overlap each other even when a horizontal displacement (of the slide length L2) occurs in the event of a large-scale earthquake. Accordingly, the seismic isolation device 2Y can support the vertical load attributed to the weight of the crane, and no overturning moment occurs therein.

However, it is necessary to select the laminated rubber 3Y so that the laminated rubber 3Y can support the vertical load attributed to the weight of the crane only with the area of the portion (the support region S) where the top plate-side projection and the bottom plate-side projection overlap each other. Here, a vertical load bearing capacity at ordinary times, i.e., when the top plate-side projection $S_T$ and the bottom plate-side projection $S_B$ completely overlap each other, is about three to five times as large as a vertical load attributed to the weight of the crane. This involves an extremely wasteful design.

Fourth, even if the increase in diameter of the laminated rubber is realized, the seismic isolation device has a problem of an increase in size that leads to an increase in weight of the crane. This is attributed to increases in weight of the rubber materials and the steel plates associated with the increase in diameter of the laminated rubber. A crane has a strict restriction against the increase in weight due to a relation with the quay strength. Accordingly, even if the above-mentioned seismic isolation device is successfully formed, it is difficult to employ the seismic isolation device in a container terminal at a port or the like.

PRIOR ART DOCUMENT

Patent Document

Patent Document 1: Japanese patent application Kokai publication No. 2001-335282

SUMMARY OF THE INVENTION

Problem to be Solved by the Invention

The present invention has been made in view of the above-mentioned problems. An object of the invention is to provide a quay crane including a seismic isolation device formed from laminated rubber, which is capable of withstanding a large-scale earthquake. In particular, it is an object of the present invention to provide a quay crane including a seismic isolation device with a slide length equal to or above ±1000 mm.

Means for Solving the Problem

A quay crane of the present invention for the purpose of achieving the object is a quay crane including a seismic isolation device, and characterized as follows. The seismic isolation device includes: laminated rubber formed by laminating a steel plate and a rubber material; and an auxiliary support mechanism. The auxiliary support mechanism includes: a supporting body fixed to one of a top plate side and a bottom plate side of the seismic isolation device; and a contacting plate fixed to the other thereof. The supporting body and the contacting plate constituting the auxiliary support mechanism come into contact with each other at least in the event of an earthquake, and the auxiliary support mechanism supports a weight of the quay crane.

According to this configuration, the quay crane can achieve a sufficient seismic isolation effect against a large-scale earthquake. This effect is attributed to the fact that the auxiliary support mechanism can support part or all of the weight of the crane in the event of an earthquake. In other words, even if the laminated rubber is deformed to the extent that the laminated rubber is unable to exert its load bearing performance, the seismic device can support the weight of the quay crane, thereby preventing the occurrence of an overturn accident and the like.

The quay crane is characterized in that the supporting body and the contacting plate constituting the auxiliary support mechanism are not in contact with each other at ordinary times, and are configured to come into contact with each other only in the event of an earthquake. According to the configuration, it is possible to curb manufacturing costs of the seismic isolation device, because the auxiliary support mechanism only has to have the strength enough to support the weight of the quay crane only in the event of an earthquake.

The quay crane is characterized in that the supporting body is formed from at least one of a roller-type supporting body having a cylindrical rotating surface, a spherical supporting body having a spherical rotating body, and a slide-type supporting body having a slide surface. This configuration makes it possible to obtain the same working/effects as those described above.

The quay crane is characterized in that the auxiliary support mechanism includes: the contact plate whose longitudinal direction coincides with a lateral movement direction of the quay crane; and the roller-type supporting body located on an extension of the contacting plate.

EFFECTS OF THE INVENTION

According to the quay crane of the present invention, it is possible to provide a quay crane including a seismic isolation device formed from laminated rubber, which is capable of withstanding a large-scale earthquake. In particular, it is possible to provide a quay crane including a seismic isolation device with a slide length equal to or above ±1000 mm.

MODES FOR CARRYING OUT THE INVENTION

Figure 1:
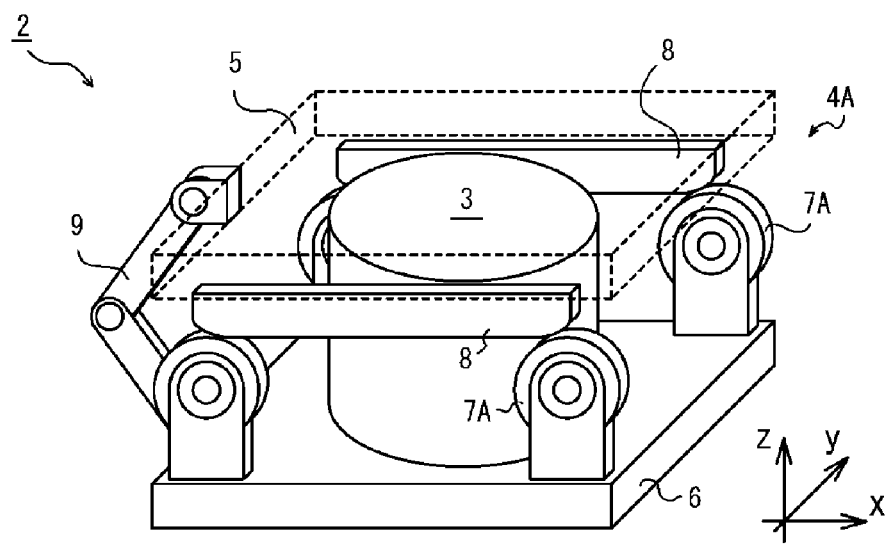
FIG. 1 is a view showing a seismic isolation device of a quay crane according to an embodiment of the present invention.

A quay crane according to an embodiment of the present invention will be described below with reference to the drawings. FIG. 1 illustrates a seismic isolation device 2 of a quay crane 1 according to the embodiment of the present invention. The seismic isolation device 2 includes: laminated rubber 3 formed by alternately laminating rubber materials and steel plates; an auxiliary support mechanism 4A; a top plate 5; and a bottom plate 6. The auxiliary support mechanism 4A includes roller-type supporting bodies 7A (supporting bodies 7) disposed on the bottom plate side, and a contacting plate 8 disposed on the top plate side. Note that the auxiliary support mechanism 4A may also be formed by disposing the roller-type supporting bodies 7A on the top plate 5 side and disposing the contacting plate 8 on the bottom plate 6 side. Here, deformation of the seismic isolation device 2 in a traveling direction y (a traveling direction of the crane) is constrained by installation of a link mechanism 9 and the like.

Figure 2:
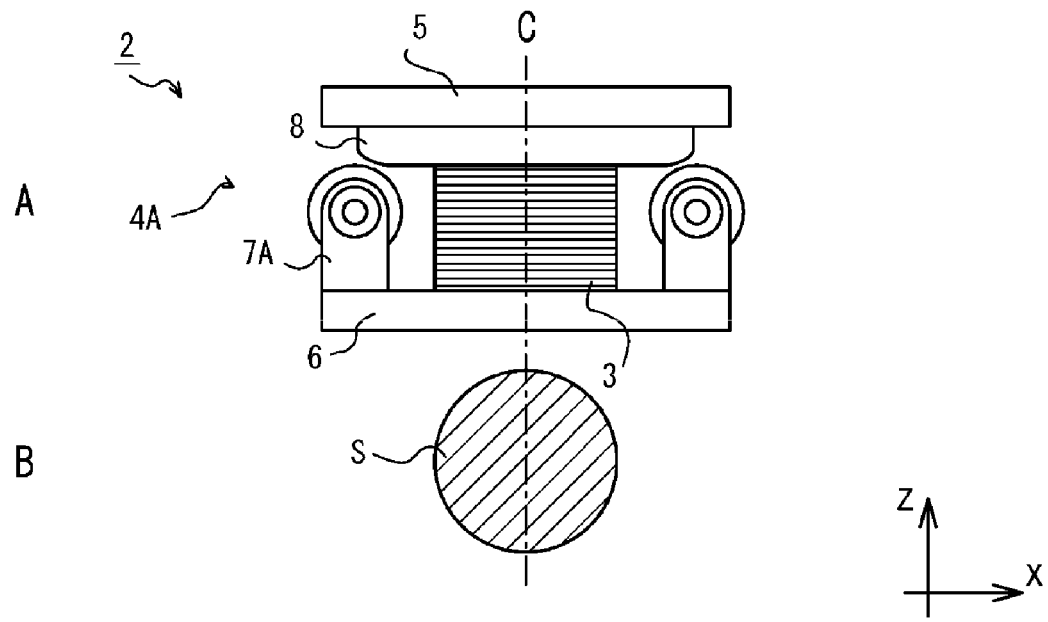
FIG. 2 is a view showing the seismic isolation device of the quay crane according to the embodiment of the present invention.

FIG. 2A illustrates a side view of the seismic isolation device 2 at ordinary times. FIG. 2B illustrates an aspect in which a top plate-side projection $S_T$ and a bottom plate-side projection $S_B$ completely overlap each other and the weight of the crane 1 is supported by a support region S. At this time, the roller-type supporting bodies 7A and the contacting plate 8, which constitute the auxiliary support mechanism 4A, are not in contact with one another. Even if the roller-type supporting bodies 7A and the contacting plate 8 are in contact with each other, it is desirable that no load be applied thereto. Here, C denotes a center line of the seismic isolation device 2.

Figure 3:
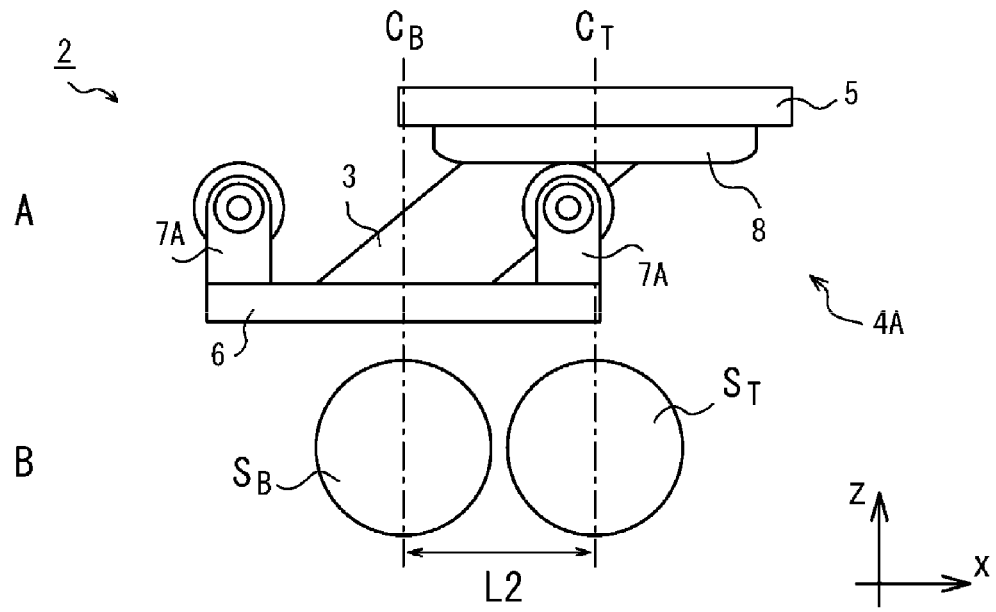
FIG. 3 is a view showing the seismic isolation device of the quay crane according to the embodiment of the present invention.

FIG. 3A illustrates a side view of the seismic isolation device 2 in the event of a large-scale earthquake. FIG. 3B illustrates a state where a slide length L2 of the seismic isolation device 2 increases by the occurrence of the large-scale earthquake and no support region S is formed. At this time, the weight of the crane 1 is supported by the auxiliary support mechanism 4A formed from the roller-type supporting bodies 7A and the contacting plate 8.

Next, actions of the seismic isolation device 2 will be described. In the seismic isolation device 2, the roller-type supporting bodies 7A and the contacting plate 8 are not in contact with each other at ordinary times (see FIG. 2A). In the seismic isolation device 2, the roller-type supporting bodies 7A come into contact with the contacting plate 8 when the top plate 5 moves relative to the bottom plate 6 in the event of an earthquake. At this time, the laminated rubber 3 and the auxiliary support mechanism 4A (the roller-type supporting bodies 7A and the contacting plate 8) support the weight of the crane 1. When the slide length of the top plate 5 increases further, the auxiliary support mechanism 4A supports the entire weight of the crane (see FIG. 3A).

The above-described configuration can achieve the following operation effects. First, even the seismic isolation device including the laminated rubber with the diameter similar to that of the conventional laminated rubber can achieve a sufficient seismic isolation effect against a large-scale earthquake. This is attributed to the fact that the auxiliary support mechanism 7A (the roller-type supporting bodies 7A and the contacting plate 8) supports the weight of the crane 1 on behalf of the laminated rubber 3 in the event of the large-scale earthquake. Thus, the occurrence of overturning moment M can be prevented.

Second, it is possible to provide the seismic isolation device 2 with the long slide length L at low costs by adopting the configuration in which no load is applied to the roller-type supporting bodies 7A and the contacting plate 8, which form the auxiliary support mechanism 4A. This is attributed to the fact that the auxiliary support mechanism 4A only needs to have the strength enough to support the weight of the crane 1 only in the event of an earthquake. In addition, it is also possible to reduce maintenance costs. This is attributable to the fact that the weight of the crane 1 is not applied to the auxiliary support mechanism 4A at ordinary times, and therefore, deterioration and damage of the roller-type supporting bodies 7 and the contacting plate 8 can be minimized while check and replacement operations thereof can be conducted easily.

Here, the roller-type supporting bodies 7A may be in contact with the top plate 5 or the bottom plate 6 without providing the contacting plate 8.

Figure 4:
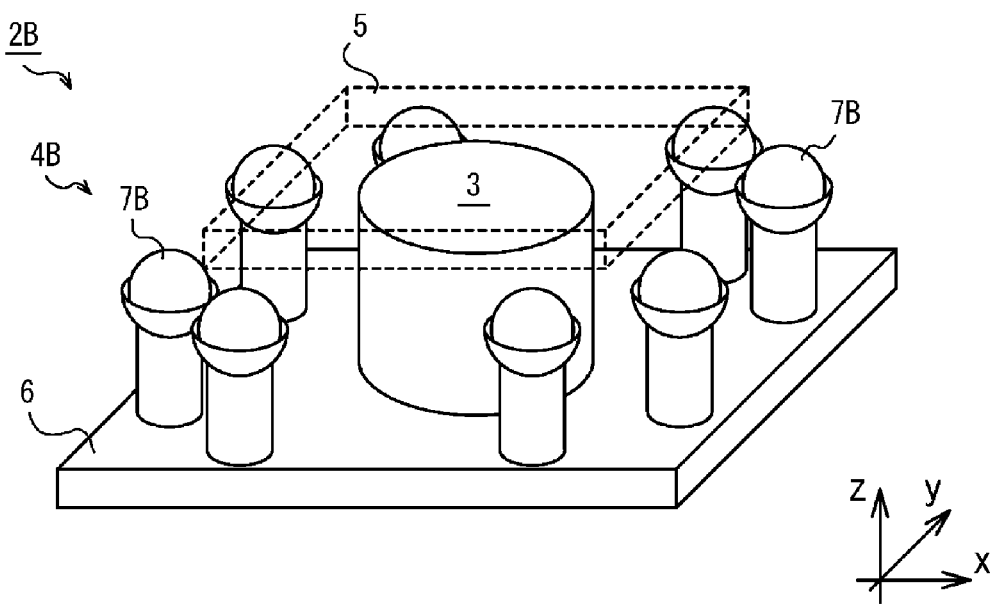
FIG. 4 is a view showing a seismic isolation device of a quay crane according to a different embodiment of the present invention.

FIG. 4 shows a seismic isolation device 2B according to a different embodiment of the present invention. An auxiliary support mechanism 4B of the seismic isolation device 2B is provided with spherical supporting bodies 7B as the supporting bodies 7, and configured to use the top plate 5 as the contacting plate 8. The spherical supporting bodies 7B are provided in a lateral movement direction x and the traveling direction y of the laminated rubber 3. Here, the seismic isolation device 2B is not constrained in the lateral movement direction x by the link mechanism 9 or the like. In other words, the laminated rubber 3 is freely deformable in the lateral movement direction x as well as in the traveling direction y.

In the event of an earthquake, the top plate 5 moves relative to the bottom plate 6, and the contacting plate 8 (the top plate 5) comes into contact with the spherical supporting bodies 7B as a consequence of the movement. At this time, the weight of the crane 1 is supported by the auxiliary support mechanism 4B which is formed from the contacting plate 8 (the top plate 5) and the spherical supporting bodies 7B. This configuration enables the crane 1 to obtain seismic isolation effects against tremors in the traveling direction y in addition to tremors in the lateral movement direction x. Here, the top plate 5 may be provided with the contacting plate 8. Alternatively, the spherical supporting bodies 7B may be provided on the top plate 5 side.

Figure 5:
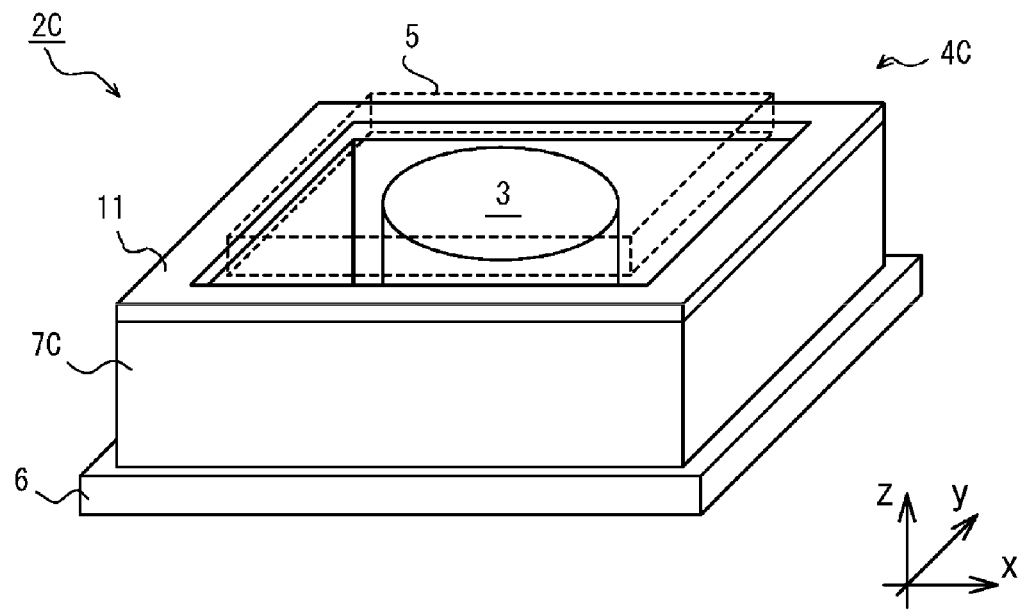
FIG. 5 is a view showing a seismic isolation device of a quay crane according to another different embodiment of the present invention.
Figure 6:
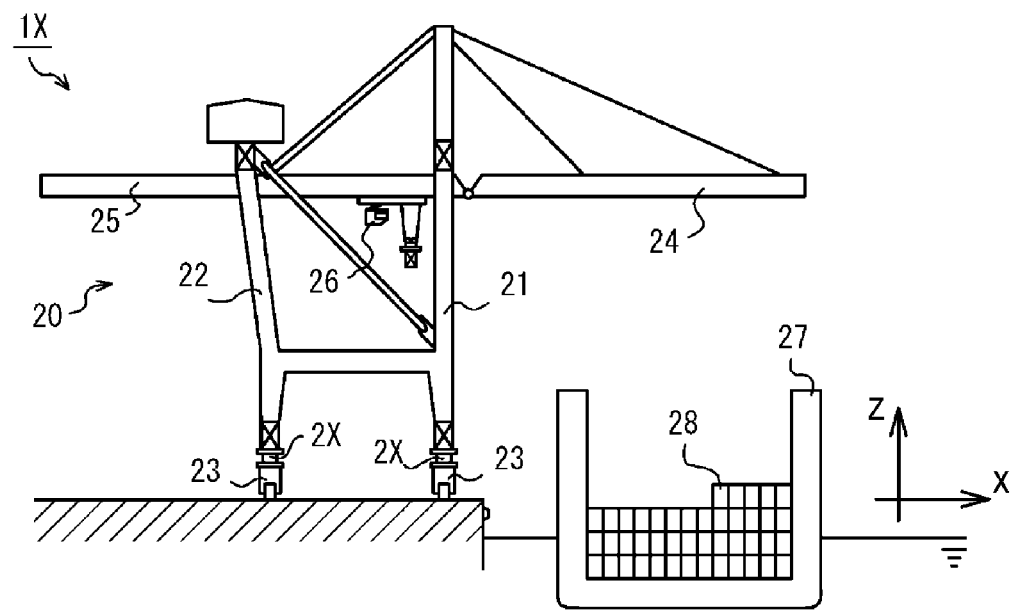
FIG. 6 is a view showing an outline of a conventional quay crane.
Figure 7:
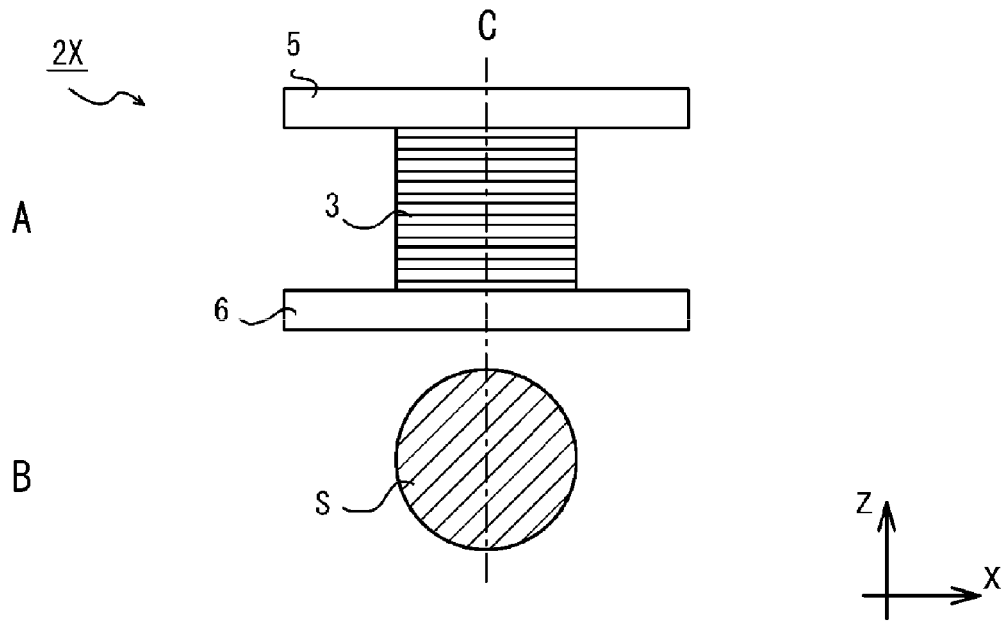
FIG. 7 is a view showing a conventional seismic isolation device.
Figure 8:
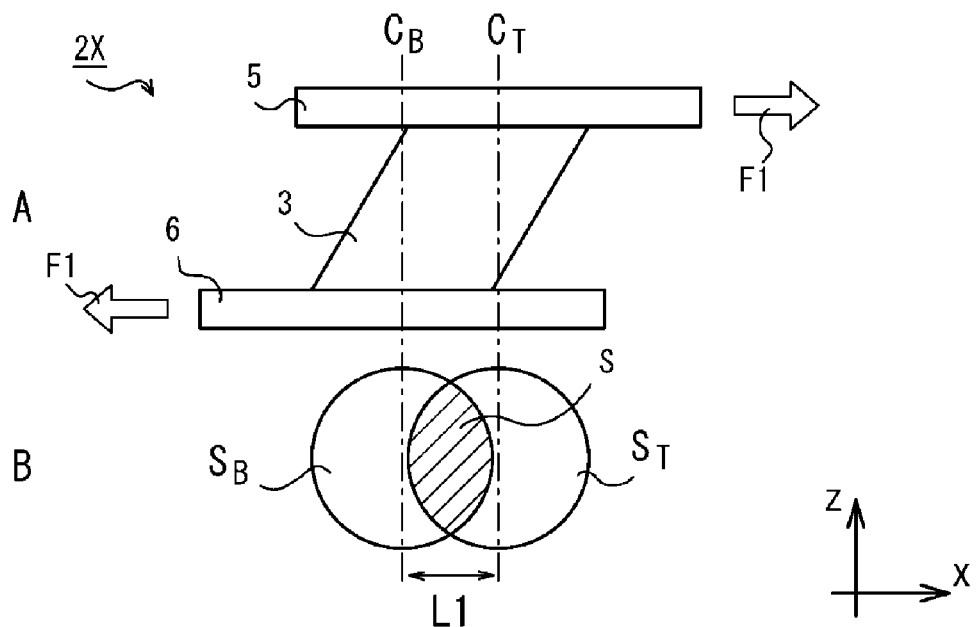
FIG. 8 is a view showing the conventional seismic isolation device.
Figure 9:
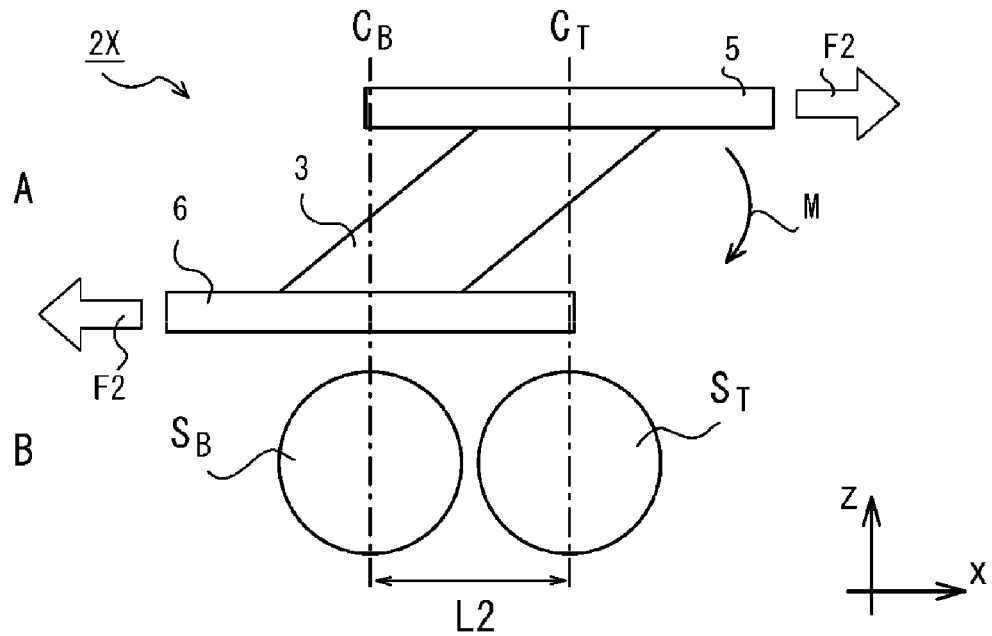
FIG. 9 is a view showing the conventional seismic isolation device.
Figure 10:
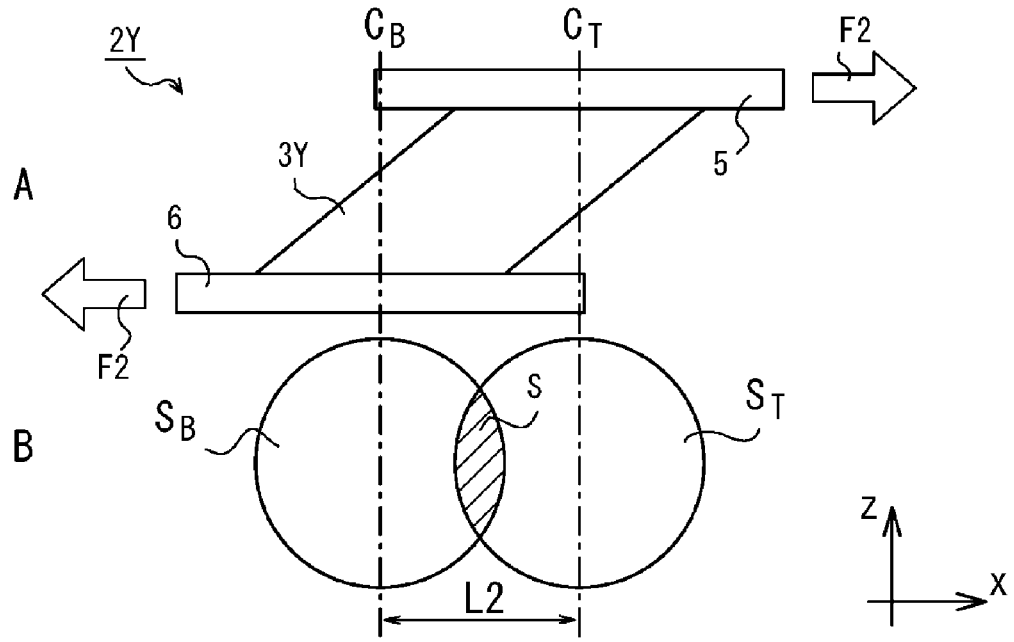
FIG. 10 is a view showing a seismic isolation device including laminated rubber with an increased diameter.

FIG. 5 shows a seismic isolation device 2C according to another different embodiment of the present invention. An auxiliary support mechanism 4C of the seismic isolation device 2C is provided with a slide-type supporting body 7C as the supporting body 7, and configured to use the top plate 5 as the contacting plate 8. The slide-type supporting body 7C includes a slide member 11 formed from a resin such as nylon. In addition, the slide-type supporting body 7C is located in a way to come into contact with the contacting plate 8 (the top plate 5) when the contacting plate 8 moves in any of the lateral movement direction x and the traveling direction y. For example, the slide-type supporting body 7C may be arranged to surround the contacting plate 8 (the top plate 5), as shown in FIG. 5. Alternatively, the slide-type supporting bodies 7C may be provided in the lateral movement direction x and the traveling direction y as in the case of the spherical supporting bodies 7B shown in FIG. 4. This configuration can achieve similar operation effects to those of the seismic isolation device 2B using the spherical supporting bodies 7B.

As described above, the seismic isolated crane 1 capable of withstanding a large-scale earthquake can be provided by the configuration in which the seismic isolation device 2 is provided with the auxiliary support mechanism 4 including the supporting bodies 7 (the roller-type supporting bodies 7A, the spherical supporting bodies 7B, and the slide-type supporting bodies 7C) and the contacting plate 8 (inclusive of the case of using the top plate 5 or the bottom plate 6). Besides the space between each travel device 23 and the corresponding leg structure 20 of the quay crane 1, the seismic isolation device 2 maybe provided, for example, at an intermediate point of each leg structure 20.

EXPLANATION OF REFERENCE NUMERALS 1 quay crane, crane
2, 2A, 2B, 2C seismic isolation device
3 laminated rubber
4, 4A, 4B, 4C auxiliary support mechanism 5 top plate
6 bottom plate
7 supporting body
7A roller-type supporting body
7B spherical supporting body
7C slide-type supporting body
8 contacting plate

The invention claimed is:

1. A quay crane having a direction of travel and including a seismic isolation device, wherein the seismic isolation device has a top plate side and a bottom plate side and comprises:

laminated rubber formed of alternating steel plate and rubber material layers laminated together, the laminated rubber being deformable in the direction of travel of the crane and a lateral direction perpendicular to the direction of travel of the crane and defining a horizontal plane therewith, in response to an external force, the laminated rubber having a top and a bottom; and an auxiliary support mechanism configured to support force in a vertical direction, the auxiliary support mechanism including:

a first part fixed to the bottom plate side of the seismic isolation device and arranged outwardly in a horizontal direction from the bottom of the laminated rubber, and a second part unconnected to the first part and fixed to the top plate side of the seismic isolation device, the second part being arranged outwardly in a horizontal direction from the top of the laminated rubber and separate from the first part, and wherein the first part and the second part constituting the auxiliary support mechanism are configured to come into contact with each other only upon deformation of the laminated rubber by an external force, and the auxiliary support mechanism supports a weight of the quay crane by means of the configuration which supports force in the vertical direction.

2. The quay crane according to claim 1, wherein the first part and the second part constituting the auxiliary support mechanism are not in contact with each other in the absence of deformation of the laminated rubber by an external seismic force, and are configured to come into contact with each other only in the event of deformation of the laminated rubber by an external seismic force.

3. The quay crane according to any one of claim 1, wherein the first part is formed from at least one of a spherical supporting body having a spherical rotating body, and a slide-type supporting body having a slide surface.

4. A quay crane having a direction of travel and including a seismic isolation device, wherein the direction of travel defines a horizontal plane with a lateral movement direction perpendicular to the direction of travel, and the seismic isolation device has a top plate side and a bottom plate side and comprises:

laminated rubber formed of alternating steel plate and rubber material layers laminated together, the laminated rubber being deformable in a lateral movement direction of the crane in response to an external force, the laminated rubber having a top and a bottom; and an auxiliary support mechanism configured to support force in a vertical direction, the auxiliary support mechanism including:

a first part fixed to the bottom plate side of the seismic isolation device and arranged outwardly in a horizontal direction from the bottom of the laminated rubber, the first part being formed from a roller-type supporting body having a cylindrical rotating surface and a second part unconnected to the first part and fixed to the top plate side of the seismic isolation device, the second part being arranged outwardly in a horizontal direction from the top of the laminated rubber and separate from the first part, and wherein the first part and the second part constituting the auxiliary support mechanism are configured to come into contact with each other only upon deformation of the laminated rubber by an external force, and the auxiliary support mechanism supports a weight of the quay crane by means of the configuration which supports force in said vertical direction.

5. The quay crane according to claim 1, wherein the first part comprises a wall-like member which surrounds the circumference of the laminated rubber in a horizontal direction and has a side in contact with the second part and parallel to the horizontal plane, and the wall-like member includes a slide member that is arranged on the surface of the side of the wall-like member in contact with the second part.

6. The quay crane according to claim 4, wherein:

the second part is a contact plate whose longitudinal direction coincides with the lateral movement direction of the quay crane; and the first part is a roller-type supporting body located on an extension of the contact plate.

* * * * *